US006216191B1

(12) United States Patent
Britton et al.

(10) Patent No.: US 6,216,191 B1
(45) Date of Patent: *Apr. 10, 2001

(54) FIELD PROGRAMMABLE GATE ARRAY HAVING A DEDICATED PROCESSOR INTERFACE

(75) Inventors: Barry K. Britton, Orefield; Alan Cunningham, Bethlehem; Wai-Bor Leung, Wescosville; Richard G. Stuby, Jr., New Tripoli; James A. Thompson, Schnecksville, all of PA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,444

(22) Filed: Oct. 15, 1997

(51) Int. Cl.[7] .................................................... G06F 13/00
(52) U.S. Cl. .............................................. 710/129; 326/34
(58) Field of Search ..................... 395/309; 326/39–45; 710/129

(56) References Cited

U.S. PATENT DOCUMENTS

| 5,596,742 | * | 1/1997 | Agarwal et al. | 395/500 |
| 5,705,938 | * | 1/1998 | Kean | 326/39 |
| 5,737,235 | * | 4/1998 | Kean et al. | 364/490 |
| 5,760,604 | * | 6/1998 | Pierce et al. | 326/41 |
| 5,764,080 | * | 6/1998 | Huang et al. | 326/41 |
| 5,773,994 | * | 6/1998 | Jones | 326/41 |
| 5,825,202 | * | 10/1998 | Tavana et al. | 326/39 |

* cited by examiner

Primary Examiner—David A Wiley
(74) Attorney, Agent, or Firm—Steve Mendelsohn

(57) ABSTRACT

A field programmable gate array (FPGA) has an interface circuit that allows signals to be transmitted directly between the FPGA and a processor. The processor interface (PI) of the FPGA enables the processor to access data at any time from either programmable logic of the FPGA or system registers of the PI. The present invention eliminates the need for external intermediate logic previously required to interface an FPGA and a processor.

7 Claims, 3 Drawing Sheets

FIELD PROGRAMMABLE GATE ARRAY HAVING A DEDICATED PROCESSOR INTERFACE

BACKGROUND OF THE INVENTION

1. Field of the Invention

The present invention relates to integrated circuits, and, in particular, to high-density programmable logic devices, such as field programmable gate arrays.

2. Description of the Related Art

Most high-density field programmable gate arrays (FPGAs) reside in systems that have a host processor, such as a microprocessor, microcontroller, digital signal processor, or any other suitable system controller having a bus interface. During the initialization, configuration, control, and monitor processes of a conventional FPGA, signals transmitted between the processor and dedicated or shared pads in the FPGA must go through some special intermediate logic that are required in order to interface the FPGA-specific signals to the processor. The FPGA pads cannot be directly connected to the host processor without this special intermediate logic.

SUMMARY OF THE INVENTION

The present invention eliminates the requirement for using special intermediate logic when transmitting signals between an FPGA and a processor. According to the present invention, the FPGA has a dedicated processor interface that provides a uniform interface to the processor during the initialization, configuration, control, and monitor processes. As used in this specification, the term "dedicated" implies that the processor interface is implemented without using any user-defined logic in the FPGA. This interface would also be available after configuring the FPGA and would allow access to user-defined programmable logic inside the FPGA. Thus, the amount of information that can be provided to or received from the FPGA is expanded. The processor interface enables the FPGA to be a memory-mapped peripheral of the processor without having to transmit signals through any external intermediate logic.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

According to the present invention, a dedicated circuit is implemented in FPGA chips, allowing the FPGA to be directly connected to a processor, such as a Motorola PowerPC™ (trademark of IBM Corporation) or an Intel i960™TM (trademark of Intel Corporation microprocessor, and to exchange data with it. This processor interface (PI) is also available to the user-defined circuit constructed in the FPGA after configuration when the FPGA enters into user operation mode.

Figure 1:
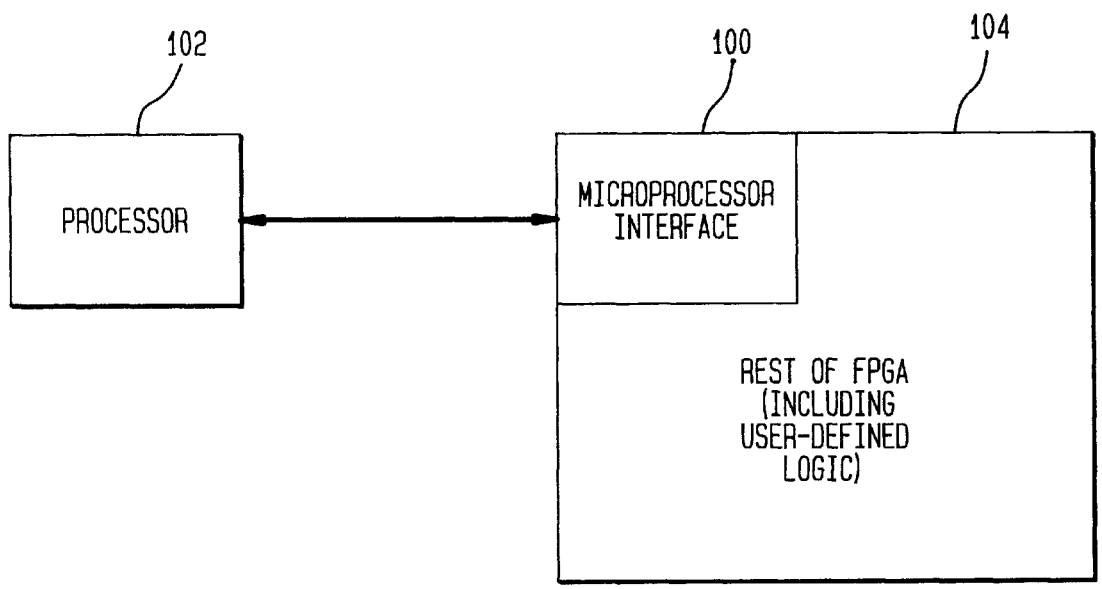
FIG. 1 shows a block diagram of a processor configured with an FPGA having a processor interface, according to one embodiment of the present invention.

FIG. 1 shows a block diagram of a processor 102 configured with an FPGA 104 having a processor interface 100, according to one embodiment of the present invention. As shown in FIG. 1, all signals transmitted from processor 102 to FPGA 104 and all signals transmitted from FPGA 104 to processor 102 are transmitted via PI 100 which is part of FPGA 104. No external intermediate logic are required to support those transmissions.

Figure 2:
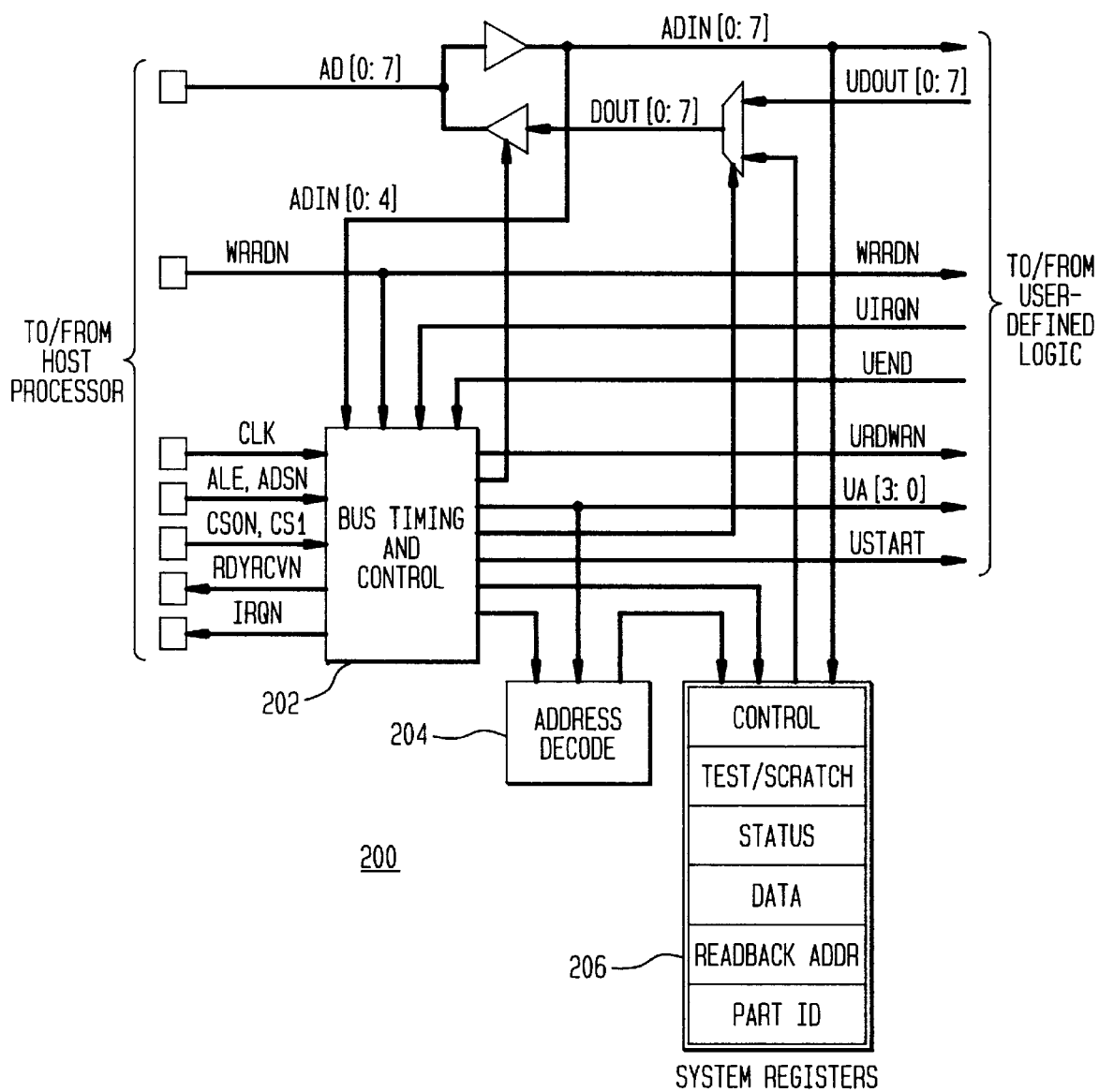
FIGS. 2 and 3 show schematic diagrams of processor interfaces for two different FPGA embodiments of the present inventions.
Figure 3:
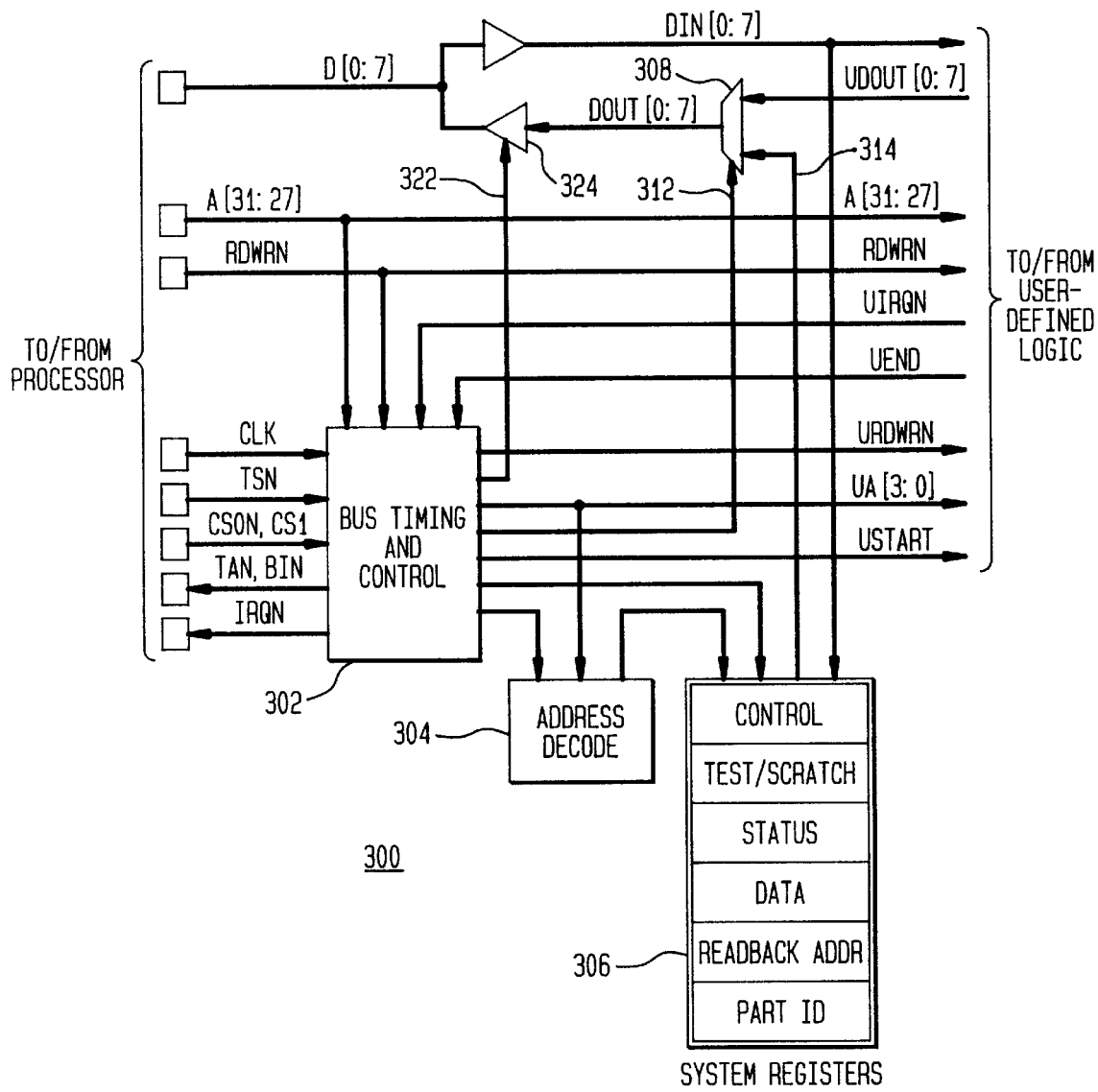

FIGS. 2 and 3 show schematic diagrams of processor interfaces 200 and 300, respectively, for two different FPGA embodiments of the present inventions. PI 200 is designed to interface the FPGA to an Intel i960™ microprocessor, while PI 300 is designed to interface the FPGA to a Motorola PowerPC™ microprocessor. It will be understood that, in alternative embodiments of the present invention, FPGAs can have processor interfaces that are designed to interface with any other suitable type of processor.

In the embodiments of FIGS. 2 and 3, major functional blocks include the bus-timing-and-control blocks (202 and 302), the address-decode blocks (204 and 304), and the system registers (206 and 306). Additional functional blocks—the user-defined registers (not shown in FIGS. 2 and 3)—are programmable and are implemented in the general programmable logic cells found in the user-defined logic.

The left side of each figure shows the signals at the FPGA pads that are coming from or going to the host processor. A subset of the bus signals from Intel i960™ and Motorola PowerPC™ microprocessors are included to enable the exchange of data between the FPGA and the host processor. The processor interface presents a set of registers that can be mapped to the address space of the host processor, similar to other peripheral chips. Processes can be initiated or terminated or their status obtained by writing to or reading from various registers. The bus-timing-and-control block takes care of the timing of various signals, recognizes the start of a bus transaction, generates the acknowledgment signal to the host processor when the transaction is completed, and performs the hand-shake protocol with user-defined logic.

The address space in the PI consists of two parts: a fixed part for the general operations of an FPGA called the system registers and a programmable part called the user-defined registers found in the user-defined logic. The following registers are shown in FIGS. 2 and 3 as part of the system registers:

Control
Test/Scratch Pad
Status
Data
Readback Address
Part ID

Through the cooperation between the system registers and other existing functional blocks of the FPGA, it is possible to perform the following tasks:

Verify the bus interface between the processor and the FPGA.

Verify the type of FPGA connected to the bus.

Initialize the FPGA.

Initiate or abort a configuration process.

Send configuration data to the FPGA.

Monitor the state of the FPGA.

Read a detailed error code for a failed configuration.

Read back configuration memory contents.

Interrupt the processor.

Supply storage locations for data without using user-defined logic.

Control and obtain status of processes that are created in the user-defined logic portion of the FPGA through user-defined registers.

Send and/or receive data from the user-defined logic through a memory-mapped interface to user-defined registers, user-defined RAM, user-defined FIFOs or other user-defined logic.

The user-defined registers (or user-defined RAM and user-defined FIFOs) are optional. They can be included in the user-defined net list, and are built from general programmable logic cells. The function or content of the user-defined registers is defined by the user. The processor interface will alert the user when the user-defined registers are being addressed by asserting the USTART signal, and will terminate the bus transaction when the user-defined logic signals that the desired operation is complete by asserting the UEND signal. The signals on the right side of FIGS. 2 and 3 are related to user-defined registers or other user-defined logic.

Through the processor interface of the present invention, the host processor can treat the FPGA like any other peripheral. Processes for the FPGA are initiated by writing/reading registers that have been mapped into the processor address space instead of applying stimuli to specific FPGA pads. This simplifies circuit board design and system software design. Further simplifying circuit-board design while reducing system cost and improving reliability is the fact that no other devices are typically required to interface the FPGA to the processor. Furthermore, accessing the user-defined logic in the FPGA is now also possible through the PI, whereas, in the past, this interface would need to have been created in the user-defined portion of the FPGA, which would have reduced the available gate count in the FPGA. The processor interface also provides a simple way to add new functions and capability to the FPGA.

The present invention is particularly useful in any type of system that normally contains microprocessors and programmable logic together, including telecommunications, data communications, and reconfigurable computing applications.

Processor Interface (PI)

According to one embodiment of the present invention, the FPGA has a dedicated synchronous processor interface function block. In this embodiment, the PI is programmable to operate with Motorola PowerPC™ MPC800 series microprocessors and Intel i960™ J core processors. The PI implements an 8-bit interface to the host processor (PowerPC™ or i960™) that can be used for configuration and read-back of the FPGA as well as for user-defined data processing and general control/monitoring of FPGA functions. In addition to dedicated function registers, the processor interface allows for the control of up to 16 user-defined registers (RAMs or flip-flops) in the FPGA logic. A synchronous or asynchronous handshake procedure is used to control transactions with user-defined logic in the FPGA array. There is also capability for the FPGA logic to interrupt the host processor either by a hard interrupt or by having the host processor poll the processor interface.

The control portion of the processor interface is available following power-up of the FPGA, even if the FPGA is not yet configured. For post-configuration use, the PI can optionally be enabled for access to the user-defined logic, or disabled to allow the pins used by the PI interface on the FPGA to be used for other functions.

Motorola PowerPC™ System Example

Details of one possible embodiment of the present invention are shown in FIG. 3, where the FPGA is a memory-mapped peripheral to a Motorola PowerPC™ processor. For purposes of this specification, the term "memory-mapped" means that the registers of the FPGA appear to the processor as an address location that can be accessed by the processor using either a memory or I/O instruction. The PowerPC™ interface uses separate address and data buses and has several control lines. The FPGA chip select lines, CS0N and CS1, are each connected to an address line coming from the PowerPC™. In this manner, the FPGA is capable of a transaction with the PowerPC™ whenever the address line connected to CS0N is low, the address line for CS1 is high, and there is a valid address on PowerPC™ address lines A[27:3 1].

Other forms of selection are possible by using the FPGA chip selects in a different way. For example, if the FPGA is the only peripheral to the PowerPC™, CS0N and CS1 could be tied low and high, respectively, to cause them to always be selected. Other decoding schemes are also possible for CS0N and CS1. One example would be to use external logic to decode the processor address to select one or more peripherals from a larger group of peripherals, where the group of peripherals contained, in addition to at least one FPGA of the present invention, one or more other FPGAs and/or one or more other types of peripherals.

With reference to FIG. 3, the basic flow of transactions on the PowerPC™ /PI interface is as follows. For both read and write transactions, the address (A[31:27]), chip selects (CS0N, CS1), and read/write (RDWRN) signal are set up at the FPGA pins by the PowerPC™. The PowerPC™ then asserts its transfer start signal (TSN) low. Data (D[0:7]) is available to the PI during a write at the rising edge of the clock (CLK) after the clock cycle during which TSN is low. The transfer is acknowledged to the PowerPC™ by the low assertion of the TAN signal. The same process applies to a read from the PI except that the read data (D[0:7]) is expected at the FPGA data pins by the PowerPC™ at the rising edge of the clock (CLK) when TAN is low.

Interrupt requests can be sent to the PowerPC™ asynchronously to the data read/write process. Interrupt requests can be sourced by the user-defined logic in the FPGA or when a specific event occurs in the PI, such as a configuration error. The PI will assert the request to the PowerPC™ as a direct interrupt signal (IRQN) and/or a pollable bit in a PI status register (discussed in the PI System Status and Control section below).

PI Interface to FPGA User-Defined Logic

The PI interfaces to the user-defined FPGA logic using an address bus (UA[3:0]), read/write control signal (URDWRN), interrupt request signal (UIRQN), and user start (USTART) and user end (UEND) handshake signals, as shown in FIGS. 2 and 3.

The n-bit addressing (where n=4, in the present example) from the PI to the user-defined logic allows for up to $2^n$ locations to be addressed by the host processor. This user-defined address space of the PI does not address any hard register. Rather, the user is free to construct registers or other logic from the user-defined logic that can be selected by the addressing. Alternatively, the address signals may be used by the user-defined logic as control signals for other functions such as state machines or timers.

The data interface between the PI and the user-defined logic is shown in FIG. 3 by the 8-bit data bus at D[0:7] (AD[0:7] for the Intel i960™ interface of FIG. 2). Although an 8-bit data interface is shown, an arbitrary bus width can be used. This data bus is bi-directional in nature, thus allowing signal flow both from the FPGA to the processor and from the processor to the FPGA. Inside of the FPGA, this data bus is typically split into two uni-directional signals: DIN[0:7] (ADIN[0:7] for FIG. 2), which transfers signals into the FPGA, and DOUT[0:7], which transfers signals out of the FPGA.

As described earlier, the PI works as a memory-mapped peripheral, where one portion of the address space reads/writes the system registers and one portion reads/writes the user-defined logic. As shown in FIG. 3, this is accomplished through multiplexor 308. The address input to the PI on A[31:27] is decoded in address-decode block 304 to determine if the given address falls into the system or user-defined address space. If the address falls in the user-defined address space, then multiplexor 308 allows the user-defined data on UDOUT[0:7] to pass to DOUT[0:7]. If the address falls in the system address space, then the appropriate system register 306 is enabled onto signal 314 and control signal 312 enables multiplexor 308 to allow signal 314 to pass to DOUT[0:7].

In order to keep bus contention from occurring on the PI data bus, the PI bus-timing-and-control block 302 also controls the output enable signal 322 to the output buffer 324 for each bit of the data bus. The PI bus-timing-and-control block reads all of the bus interface control signals to determine if the processor is trying to read data from the current FPGA, either from the system registers or the user-defined logic. If a read from the given FPGA is requested, the output enable signal 322 is enabled to allow DOUT[0:7] to drive onto D[0:7]. Otherwise, signal 322 is disabled to tri-state output buffer 324.

The transaction sequence between the PI and the user-defined logic is as follows. When the host processor initiates a transaction as discussed in the preceding sections, the PI outputs the user address (UA[3:0]) and the read/write control signal (URDWRN), and then asserts the user start signal (USTART). During a write from the host processor, the user-defined logic can accept data written by the host processor from the D[7:0] pins once the USTART signal is asserted. The user-defined logic ends a transaction by asserting an active-high user end (UEND) signal to the PI.

The PI will insert wait states in the host processor bus cycles, holding the host processor until the user-defined logic completes its task and returns a UEND signal, upon receipt of which the PI generates an acknowledgment signal to the processor. If the host processor is reading from the FPGA, the userdefined logic will have the read data available on the D[7:0] pins of the FPGA when the UEND signal is asserted.

PI System Status and Control

The PI has a series of addressable system registers that provide PI control and status, configuration and read-back data transfer, FPGA device identification, and a dedicated user scratchpad register. Any or all of the registers can be accessed at any time, including during the time when the user-defined logic is active. In the past, these status and control registers were created in a separate device and then connected to the FPGA status and control pins.

Control Registers

The PI control registers (Control) are read/write registers. The host processor writes the control registers in order to control a set of processes in the FPGA, such as device reprogram, device reset, or device modes of operation. The control registers are readable by the host processor to verify the status of control bits it had previously written.

Scratchpad Registers

The PI scratchpad registers (Test/Scratch) are read/write registers with no defined operation. They may be used for any user-defined function.

Status Registers

The PI status registers (Status) are read-only registers that provide information to the host processor on a set of processes in the FPGA, such as configuration state, initialization state, or to flag FPGA errors of operation.

Configuration Data Register

The PI configuration data register (Data) is a writeable register in configuration mode and a readable register in read-back mode. For FPGA configuration, this is where the configuration data bytes are sequentially written by the host processor. Similarly, for read-back mode, the PI provides the read-back data bytes in this register for the host processor.

Read-Back Address Registers

The PI read-back address registers (Readback Addr) are used to set the starting location of the configuration data to be read back.

Device Identification Registers

The PI device identification registers (Part ID) are read-only registers which are read to inform the processor what type of FPGA it is accessing.

The PI of the present invention is a general-purpose logic block. The functions that can be performed through the PI cover most FPGA operations, and provides the facility to introduce new operations. The PI co-exists with previously defined configuration signals/functions. The interface can be enabled during the configuration phase, or user-defined logic phase, or both phases.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A field programmable gate array (FPGA) having a dedicated internal processor interface (PI) that enables the FPGA to interface directly with an external processor without having to transmit signals through any external intermediate logic, wherein the PI enables access to dedicated, non-user-defined system-level FPGA control and status registers that are always available to the PI, including prior to any FPGA configuration RAMs having been programmed and regardless of how any of the FPGA configuration RAMs are programmed.

2. The invention of claim 1, wherein the PI is field configurable for connecting the FPGA to operate with any one of a plurality of different types of external processors through selection of external pins of the FPGA or programming of configuration RAM bits in the FPGA.

3. The invention of claim 1, wherein system registers in the PI enable the processor to program configuration RAMs and receive configuration RAM status information directly from the FPGA through the PI without having to transmit signals through any external intermediate logic.

4. The invention of claim 1, wherein the PI enables processes in the processor to access data from or supply data to programmable user-defined logic of the FPGA.

5. The invention of claim 1, wherein the PI is adapted to read back a device identification unique to the FPGA.

6. The invention of claim 1, wherein the PI and user-defined logic in the FPGA are each configurable to interrupt the processor to get the processor's attention through a dedicated interrupt procedure of the processor.

7. The invention of claim 1, wherein:

the PI is field configurable for connecting the FPGA to operate with any one of a plurality of different types of external processors through selection of external pins of the FPGA or programming of configuration RAM bits in the FPGA;

system registers in the PI enable the processor to program configuration RAMs and receive configuration RAM status information directly from the FPGA through the PI without having to transmit signals through any external intermediate logic;

the PI enables processes in the processor to access data from or supply data to programmable user-defined logic of the FPGA;

the PI is adapted to read back a device identification unique to the FPGA; and the PI and user-defined logic in the FPGA are each configurable to interrupt the processor to get the processor's attention through a dedicated interrupt procedure of the processor.

* * * * *